United States Patent
Ljung

(10) Patent No.: US 9,521,611 B2
(45) Date of Patent: Dec. 13, 2016

(54) METHODS AND APPARATUSES FOR CELL EVALUATION

(75) Inventor: Petter Ljung, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 14/127,282

(22) PCT Filed: Jun. 29, 2011

(86) PCT No.: PCT/SE2011/050866
§ 371 (c)(1),
(2), (4) Date: Dec. 18, 2013

(87) PCT Pub. No.: WO2013/002689
PCT Pub. Date: Jan. 3, 2013

(65) Prior Publication Data
US 2014/0112182 A1    Apr. 24, 2014

(51) Int. Cl.
H04L 12/26 (2006.01)
H04J 11/00 (2006.01)
H04B 7/212 (2006.01)
H04W 48/20 (2009.01)
H04W 24/10 (2009.01)
H04W 36/30 (2009.01)

(52) U.S. Cl.
CPC ............ *H04W 48/20* (2013.01); *H04W 24/10* (2013.01); *H04W 36/30* (2013.01)

(58) Field of Classification Search
CPC ...... H04W 48/20; H04W 24/10; H04W 36/30; H04W 36/26; H04W 25/0206
See application file for complete search history.

(56) References Cited

U.S. PATENT DOCUMENTS

| 7,697,449 B1* | 4/2010 | Shirali ............... H04L 25/0206 370/208 |
| 7,965,686 B1* | 6/2011 | Bridge ................. H04W 48/20 370/332 |
| 2006/0140117 A1* | 6/2006 | Aerrabotu ............ H04W 36/26 370/232 |

FOREIGN PATENT DOCUMENTS

| WO | 9917582 A1 | 4/1999 |
| WO | 2008049238 A1 | 5/2008 |

OTHER PUBLICATIONS

Unknown, Author. "3rd Generation Partnership Project; Technical Specification Group Radio Access Network; Evolved Universal Terrestrial Radio Access (E-UTRA); User Equipment (UE) procedures in idle mode (Release 10)." 3GPP TS 36.304 V10.1.0. Mar. 2011.

* cited by examiner

*Primary Examiner* — Kiet Tang
(74) *Attorney, Agent, or Firm* — Murphy, Bilak & Homiller, PLLC

(57) ABSTRACT

Methods and apparatuses for cell evaluation by a mobile terminal in a cellular network. A base station (100A, 100B) of a cell (102A, 102B) estimates values of an Expected User Throughput, EUT, for a series of candidate Reference Signal Quality, RSQ, values, and broadcasts (1:1A, 1:1B) the estimated EUT values as EUT information in the cell. The mobile terminal (104) is then able to evaluate (1:2-1:4) the cell for cell selection or re-selection based on the broadcasted EUT information.

18 Claims, 3 Drawing Sheets

METHODS AND APPARATUSES FOR CELL EVALUATION

TECHNICAL FIELD

The present disclosure relates generally to a solution for supporting cell evaluation for mobile terminals in a cellular network for radio communication.

BACKGROUND

Cellular networks for radio communication typically comprise multiple cells with radio coverage provided by base stations or other radio nodes, which thus can provide connections for mobile terminals, or User Equipments (UEs), when present in respective cells. In the following, the term "base station" will be used to generally represent a node providing radio coverage in a cell, which node is commonly referred to as a radio base station, base transceiver station, e-Node B, etc., depending on the technology and terminology used. The term "terminal" will also be used for short in this description to represent any wireless or mobile terminal or device capable of radio communication with a base station. It should be further noted that this description pertains to any technologies and communication standards where cell evaluation can be employed, such as Global System for Mobile communication (GSM), Universal Mobile Telecommunications System (UMTS), Long Term Evolution (LTE), etc.

A cellular network is typically divided into so-called "tracking areas", sometimes also termed "registration areas", "location areas" or "paging areas". Such tracking areas are used to enable paging of terminals based on e.g. tracking area update messages transmitted regularly from the terminals to the network as they move from one tracking area to another. In this way, the network can page a terminal for an incoming call or session by transmitting a paging message only in the cells of the terminal's latest reported tracking area. Thus, an idle terminal needs to be served by a base station in an appropriate cell in order to detect such a paging message, among other things.

When a terminal is present in an area of cells covered by different base stations, it selects one of the cells to be its "serving cell" by measuring cell-specific Reference Signals (RSs) being constantly transmitted, typically with fixed power, in the cells from respective base stations. The cell-specific reference signal may be denoted depending on the standard used, such as "RS signal" or "common pilot channel". In some examples, LTE uses a Cell Specific Reference signal (CRS), Wideband Code Division Multiple Access (WCDMA) uses a Common Pilot Channel (CPICH) and GSM uses a Broadcast Control Channel (BCCH) for estimating signal quality. The terminals are thus configured to receive and measure such reference signals from different base stations, and to evaluate the cells based on an estimated quality of the received reference signals in order to select a serving cell to "camp" on.

The signal quality can be estimated in different ways, e.g. by measuring the received power or strength of the reference signal, or by measuring the power-to-interference ratio of the reference signal. The signal quality estimate of the cell obtained in this way will be referred to as Reference Signal Quality (RSQ) in the following, regardless of how the signal quality is estimated in practice. The cell having the "best", i.e. highest, RSQ is then typically selected by the terminal as the serving cell, which the terminal can use for receiving network information, listening for paging messages, sending tracking area update messages, as well as for establishing a connection for a communication session when required.

The process of evaluating cells for selecting a cell as suitable for being the terminal's serving cell is commonly referred to as "cell selection", while the process of selecting a new cell to replace a current cell as the terminal's serving cell is commonly referred to as "cell re-selection". The terminals are configured to frequently perform cell evaluation when not engaged in a communication session, which is sometimes called that the terminals are in the "idle state". A terminal may thus change its serving cell, i.e. perform cell re-selection, when the estimated RSQ from a new cell is sufficiently higher than the estimated RSQ from the current serving cell.

The decision whether to change the serving cell or not is taken by the terminal based solely on the above signal measurements. Typically, it also depends on a predefined cell evaluation condition. For example, the cell evaluation condition may dictate that re-selection from a current serving cell to a new cell should be made when the RSQ of the new cell exceeds the RSQ of the current serving cell with a certain amount "A", or when the RSQ of the new cell exceeds a certain threshold "T". The above parameters A and T may be configurable, e.g. to avoid unwanted re-selection oscillations while still ensuring that a proper cell is selected for correct and efficient signal reception and radio performance. A hysteresis may also be employed such that a new cell re-selection cannot occur until a certain time has elapsed since the latest cell re-selection.

However, it has been recognized as a problem that the RSQ is not always a very accurate indicator of the radio performance in the cell but can actually be rather misleading sometimes, such as when the cells have different abilities for serving terminals in terms of data communication and accessibility.

Even though it may be possible to deal with this problem, at least partly, by configuring the above parameters A and T to compensate for any such differences between cells, considerable efforts and knowledge are required from the network operator to enable useful and comparable measurements of the RSQ for evaluation of the cells. Moreover, the parameters A and T may need to be configured dynamically due to changing conditions and must also be communicated to all terminals for them to apply the parameters properly when evaluating their signal measurements.

SUMMARY

It is an object of the invention to address at least some of the problems and issues outlined above. It is possible to achieve these objects and others by using methods and apparatuses as defined in the attached independent claims.

According to one aspect, a method is provided in a base station providing radio coverage in a cell, for supporting cell evaluation for mobile terminals in a cellular network. In this method, the base station determines a set of cell-specific parameters pertaining to data throughput in the cell, and estimates values of an Expected User Throughput, EUT, for a series of candidate Reference Signal Quality, RSQ, values based on the determined set of cell-specific parameters. The base station then broadcasts the estimated EUT values as EUT information in the cell. Thereby, mobile terminals are enabled to evaluate the cell for cell selection or re-selection based on the broadcasted EUT information.

According to another aspect, a base station is configured to provide radio coverage in a cell and support cell evaluation for mobile terminals in a cellular network. The base station comprises a determining unit adapted to determine a set of cell-specific parameters pertaining to data throughput in the cell, and an estimating unit adapted to estimate values of an Expected User Throughput, EUT, for a series of candidate Reference Signal Quality, RSQ, values based on the determined set of cell-specific parameters. The base station also comprises a broadcasting unit adapted to broadcast the estimated EUT values as EUT information in the cell, to enable mobile terminals to evaluate the cell for cell selection or re-selection based on the broadcasted EUT information.

The broadcasted EUT information of this solution thus reflects the performance that can be achieved in the cell at different signal qualities, which provides a more relevant and truthful basis for evaluating cells by mobile terminals, as compared to conventionally using just the RSQ parameter.

The above method and base station may be configured and implemented according to different optional embodiments. In one possible embodiment, the cell-specific parameters are related to at least one of: a current traffic load in the cell, radio resources available for the cell, statistics on data throughput achieved in previously executed sessions in the cell at one or more of said candidate RSQ values, and currently broadcasted EUT information. The above-mentioned radio resources may include at least one of: bandwidth allocated for the cell, the number of antennas used by the base station, hardware equipment in the base station, software installed in the base station and radio access technology used by the base station.

In other possible embodiments, estimating the EUT values may comprise at least one of: calculating the EUT values based on a link budget corresponding to each candidate RSQ value, and deriving the EUT values from statistics on data throughput achieved in previously executed sessions in the cell at different candidate RSQ values and traffic load conditions.

The broadcasted EUT information may further comprise one EUT value representative for each candidate RSQ value, or a first EUT value pertaining to uplink and a second EUT value pertaining to downlink for each candidate RSQ value.

According to another aspect, a method is provided in a mobile terminal for cell evaluation in a cellular network. In this method, the mobile terminal reads Expected User Throughput, EUT, information broadcasted from a base station providing radio coverage in a cell, said EUT information comprising cell-specific EUT values for a series of candidate Reference Signal Quality, RSQ, values. The mobile terminal then determines from the EUT information a valid EUT value that corresponds to an RSQ value measured on reference signals from the base station, and evaluates the cell for cell selection or re-selection based on the determined valid EUT value.

According to another aspect, a mobile terminal is configured to support cell evaluation in a cellular network. The mobile terminal comprises a reading unit adapted to read Expected User Throughput, EUT, information broadcasted from a base station providing radio coverage in a cell, said EUT information comprising cell-specific EUT values for a series of candidate Reference Signal Quality, RSQ, values. The mobile terminal also comprises an evaluating unit adapted to determine from the EUT information a valid EUT value that corresponds to an RSQ value measured on reference signals from the base station, and to evaluate the cell for cell selection or re-selection based on the determined valid EUT value.

The above method and mobile terminal may be configured and implemented according to different optional embodiments. In one possible embodiment, a valid EUT value is determined for at least one other cell and the cells are ranked according to their valid EUT values, wherein a cell having the highest EUT value is selected as serving cell for the terminal. Further, a new cell, different from a current serving cell, may be selected as serving cell for the terminal if the new cell fulfils a predefined evaluation condition for the determined valid EUT value. In another possible embodiment, the EUT information may be used for evaluating the cell only if the measured RSQ value exceeds a preset minimum threshold.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided to enable more accurate cell evaluation for mobile terminals in a cellular network by broadcasting from the base stations a newly introduced cell-specific information element or parameter which in this description will be termed "Expected User Throughput", EUT. In this solution, the base stations estimate values of the EUT parameter for different RSQ values, i.e. by calculating or otherwise deriving the throughput of data that a mobile terminal is potentially able to achieve with different signal qualities as indicated by measured RSQ values. The base stations then broadcast the estimated EUT values as "EUT information" which can be received and read by any nearby mobile terminals as a basis for cell evaluation. In this description, "user throughput" and "data throughput" are equivalent and these terms can be mutually exchanged throughout.

The EUT parameter may be estimated for a number of candidate RSQ values in different ways. For example, the EUT values may be theoretically calculated for each cell based on a link budget for each candidate RSQ value in that particular cell, which will be described in more detail later below. Alternatively or additionally, the EUT values may be derived from stored statistics on actual throughput previously achieved in sessions executed in the cell at different RSQ values and different load conditions, to be broadcasted when similar load conditions occur in the cell.

A mobile terminal can then, for one or more potential cells, measure the RSQ as usual, i.e. quality of received reference signals, translate the measured RSQ value into a corresponding EUT value according to the broadcasted EUT information, and evaluate the measured cells for selection or re-selection according to their EUT values. The EUT parameter or element is a more useful basis for the cell evaluation, as compared to using only the conventional RSQ parameter, by indicating an actual ability to serve the terminal. For example, a cell may provide for very good signal quality in a measuring mobile terminal but may at the same time be short on resources for serving the terminal which will be reflected by an EUT value valid for the measuring terminal, making the cell a poor candidate for the terminal to camp on.

Figure 1:
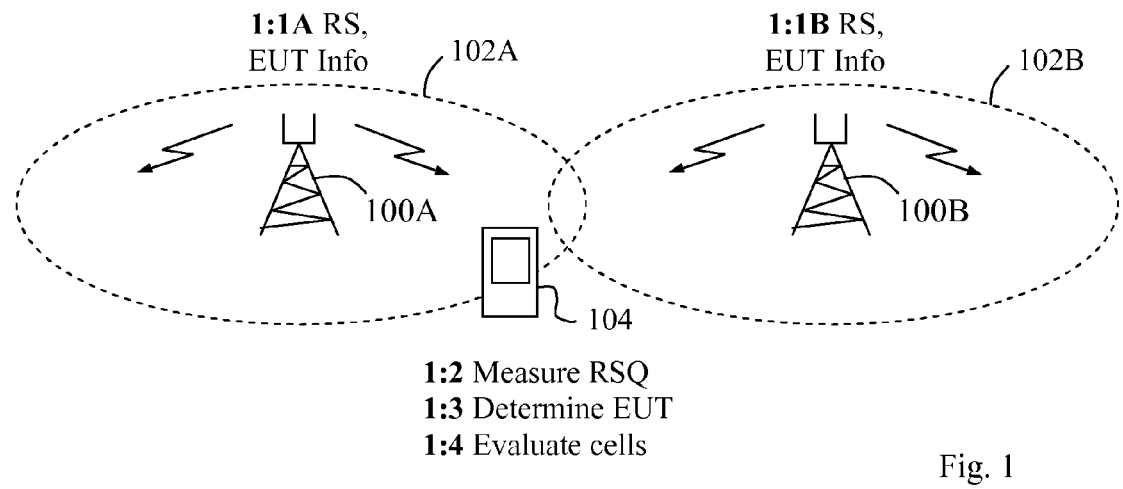
FIG. 1 is a communication scenario illustrating how two exemplary cells can be evaluated for cell selection or re-selection by a terminal, according to a possible embodiment.

An example of how cells in a cellular network can be evaluated by a mobile terminal for cell selection or re-selection, will now be described with reference to the scenario illustrated in FIG. 1. In this example, two base stations 100A and 100B provide radio coverage in cells 102A and 102B, respectively, and a mobile terminal 104 is located in the network such that it is able to receive and read information broadcasted by the base stations 100A and 100B, including the above-described cell-specific EUT information. At this point, the terminal 104 may already be camping on a cell, e.g. one of the cells 102A and 102B.

The terminal 104 is configured to perform cell re-selection in order to be connected to a useful serving cell, which in this solution is selected based on the broadcasted EUT information as follows. In this regard, it is assumed that both cells 102A, 102B are potential serving cells for the terminal 104 since it can read broadcasted information of the cells. Although only two cells are involved in this example, it should be understood that any number of cells may be involved in cell evaluation as described here.

As indicated by actions 1:1A and 1:1B, the base stations 100A, 100B broadcast cell-specific EUT information and also transmit cell-specific reference signals "RS" at fixed power on which any mobile terminals in the area can measure RSQ according to regular procedures. The EUT information comprises values of expected user throughput, EUT values, which the base stations have estimated for a series of different candidate RSQ values. The EUT values indicate the throughput of data that a mobile terminal can achieve at respective candidate RSQ values. Thus, each candidate RSQ value is associated with a cell-specific EUT value in the broadcasted EUT information, which may be presented in the form of a table or the like.

The broadcasted EUT information may comprise a single EUT value representative for each candidate RSQ value, where the representative EUT value may pertain to either uplink or downlink transmissions or both. Alternatively, the EUT information may comprise a first EUT value pertaining to uplink transmissions and a second EUT value pertaining to downlink transmissions, the first and second EUT values being jointly representative for each candidate RSQ value. The process of obtaining values of the EUT parameter for different RSQ values will be described in more detail later below with reference to FIGS. 2-6.

A next action 1:2 indicates that the terminal 104 measures the RSQ on the reference signals transmitted by the base stations 100A, 100B. In FIG. 1, the terminal 104 is shown located somewhat closer to base station 100A than to base station 100B, likely resulting in a stronger signal from base station 100A and a higher RSQ measured at the terminal, as compared to the signal from base station 100B. In conventional procedures for cell selection or re-selection, the terminal 104 would therefore rank cell 102A higher than cell 102B when evaluating the cells.

In this solution however, instead of evaluating the cells 102A and 102B for selection merely based on the measured RSQ values, the terminal 104 reads the EUT information broadcasted from each base station 100A, 100B and determines a valid EUT value in the EUT information that corresponds to the measured RSQ value of each cell, in a further action 1:3. If the measured RSQ value does not exactly match a candidate RSQ value in the EUT information, the terminal may select the candidate RSQ value in the EUT information being closest to the measured RSQ value for determining a valid EUT value in this process. Alternatively, the valid EUT value may be determined by interpolation or extrapolation of EUT values in the EUT information, in proportion to the deviation of the measured RSQ value from the candidate RSQ values.

The terminal 104 then evaluates the cells 102A, 102B based on the determined valid EUT values for each cell, in a last shown action 1:4. Even though the terminal 104 is located closer to base station 100A than to base station 100B, the valid EUT value of base station 100A is not necessarily higher than the valid EUT value of base station 100B, due to various cell-specific factors which will be described in more detail below. In this solution, the determined valid EUT value is a more accurate indicator of radio performance in a cell than the measured RSQ value and the terminal 104 can rank the cells accordingly in the evaluation.

Figure 2:
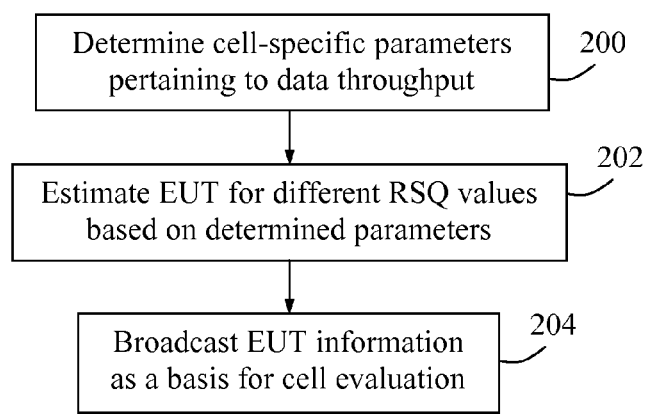
FIG. 2 is a flow chart illustrating a procedure in a base station for supporting cell evaluation, according to further possible embodiments.

With reference to the flow chart in FIG. 2, the solution will now be described in terms of actions executed in a base station providing radio coverage in a cell of a cellular network, such as base stations 100A, 100B in FIG. 1. It is assumed that the base station more or less continuously transmits reference signals as usual on which mobile terminals can measure the RSQ according to regular procedures. In this solution, the base station will also broadcast cell-specific EUT information as a basis for cell evaluation by mobile terminals in the area. Before that, however, the base station must determine the EUT information to be broadcasted as follows.

In this process, the base station determines a set of cell-specific parameters pertaining to data throughput in the cell, as shown in an action 200, which will be used for estimating the EUT. The term "cell-specific parameters" thus refer to any factors or conditions which potentially have influence on the data throughput that can be achieved by communicating mobile terminals when connected to the base station, e.g. in terms of kilobits per second, kbps. Some examples of such cell-specific parameters that may be used in this context, without limitation, include:

A) A current traffic load in the cell. This parameter may have a significant influence on the data throughput in the cell such that a high traffic load implies that many mobile terminals are active in communication and must share a restricted amount of radio resources in the cell, e.g. when using scheduling procedures, resulting in limited throughput for each mobile terminal, at least in average, thus implying a relatively low EUT value. On the other hand, if the traffic load is relatively low, each individual mobile terminal can use a greater amount of radio resources resulting in higher throughput thus implying a relatively high EUT value.

B) The amount of radio resources available for the cell, e.g. in terms of bandwidth allocated for the cell, the number of antennas used by the base station, hardware equipment in the base station, software installed in the base station, radio access technology used by the base station, etc. Naturally, this parameter affects the data throughput in the cell in that a large amount of available radio resources can provide for relatively high throughput in the cell, while a smaller amount of available radio resources entails lower throughput.

C) Statistics on data throughput achieved in previously executed sessions in the cell at different candidate RSQ values and traffic load conditions. This parameter thus reflects a history of data throughputs achieved for mobile terminals in the cell in the past when having measured the respective RSQ values. If this parameter is used for predicting the throughput for mobile terminals in the cell, it is assumed that if a certain level of data throughput has been achieved in the past at certain traffic load conditions, the same throughput level will likely be achieved also in the future at similar traffic load conditions.

D) Currently broadcasted EUT information. This parameter may be considered such that the current, i.e. the most recently broadcasted, EUT information is maintained in the broadcast if the radio conditions have not changed significantly in the cell, or if oscillating cell re-selections should be avoided. For example, the base station may be configured not to change the EUT information in the broadcast until a certain time has elapsed since the foregoing change. This may be valuable because if the EUT information is changed too frequently, a large number of mobile terminals may switch their serving cell quite often causing undue burden on the base station.

Of the above examples, A) is a typically dynamic parameter that may rapidly change over time, while B) is a more or less static parameter dependent on the configuration in the base station although it may change once in a while. Parameter C) may change relatively slowly over time while parameter D) may change more rapidly depending on whether the load conditions in the cell change.

In a next action 202, the base station estimates values of the EUT parameter for different candidate RSQ values based on the determined cell-specific parameters, e.g. using any of the examples presented above. As mentioned above, the EUT values are consequently cell-specific and can be determined in different ways.

One possible option is to calculate the EUT values theoretically for each RSQ value based on a theoretical model considering the cell's available radio resources according to parameter B) and the current level of traffic load according to parameter A). The theoretical model may involve calculating a link budget for each candidate RSQ value under the current circumstances, as mentioned above.

A link budget includes basically a description of all of the gains and losses of signals from a transmitter to a receiver, implied by the considered candidate RSQ value, which accounts for the attenuation of the transmitted signal due to propagation through the air interface and intermediate equipment. Knowing the RSQ value and parameters A) and B), such a link budget can thus be calculated and the resulting data throughput can be estimated therefrom, e.g. according to a known conventional calculation method, which is not necessary to describe as such in any detail to understand this solution.

Another possible option mentioned above is to derive the EUT values for the candidate RSQ values empirically from stored statistics on data throughputs previously achieved for sessions in the cell during similar load conditions according to C) above, thus assuming that the conditions for communication have not changed significantly such that the EUT values will be valid also for any forthcoming sessions.

In a final shown action 204, the base station broadcasts EUT information comprising the candidate RSQ values and associated estimated EUT values, as a basis for cell evaluation, corresponding to actions 1:1A, 1:1B above.

Figures 3, 5:
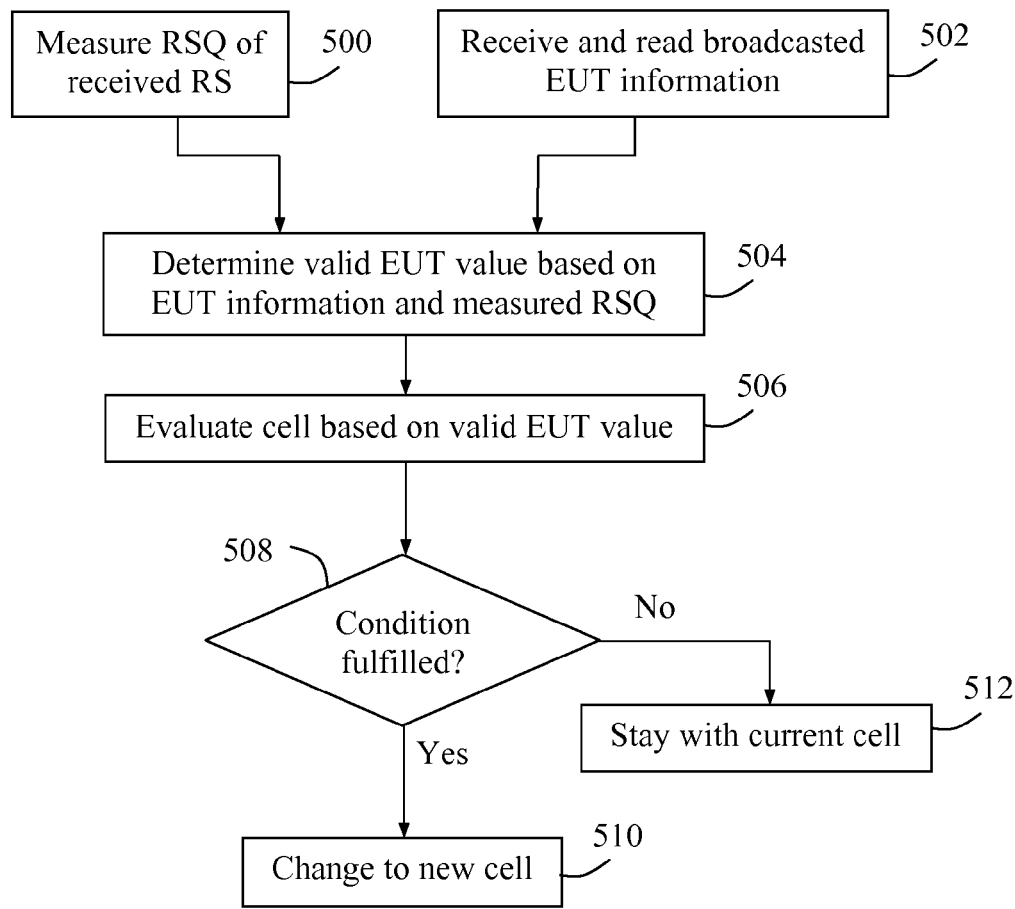
FIG. 3 is a flow chart illustrating a procedure in a terminal for supporting cell evaluation, according to further possible embodiments.
FIG. 5 is a schematic diagram illustrating a second example of broadcasted information on expected user throughput, according to another possible embodiment.

FIG. 3 illustrates a first example of EUT information broadcasted from a base station 300. The broadcasted EUT information is shown as a table 302 with a column 302a with candidate RSQ values in dB and another column 302b with associated estimated EUT values in kbps. It can be seen in this example that a relatively "bad" RSQ value of, say, −120 dB is assumed to provide a low expected data throughput EUT of 10 kbps, while a "better" RSQ value of, say, −90 dB is assumed to provide a significantly higher expected data throughput EUT of 1000 kbps. In another cell, these figures may be different such that the same measured RSQ value could result in different EUT values in that cell. For example, a measured RSQ value of −120 dB may instead be assumed to provide an EUT of 100 kbps and a RSQ value of −90 dBm may be assumed to provide an EUT of 700 kbps in the other cell. The cells may thus be ranked differently than when only the RSQ parameter is used for evaluation.

Figure 4:
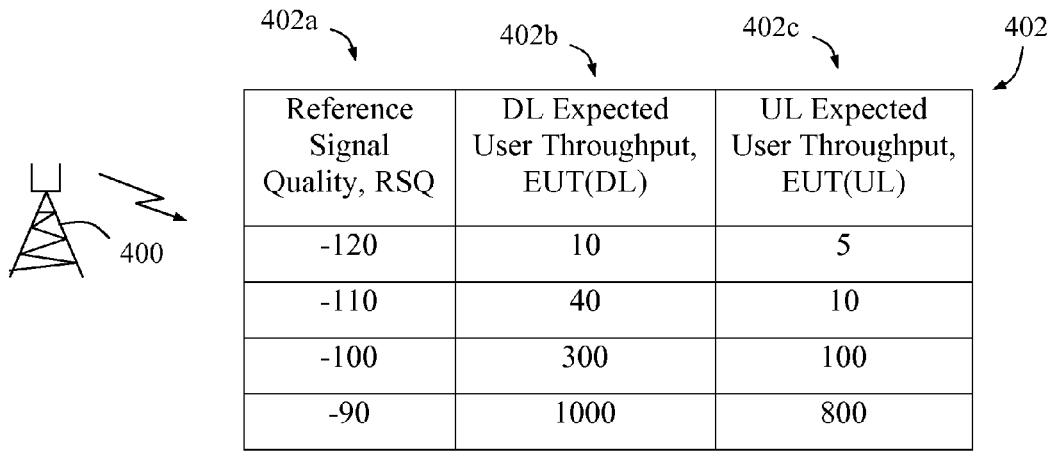
FIG. 4 is a schematic diagram illustrating a first example of broadcasted information on expected user throughput, according to a possible embodiment.

FIG. 4 illustrates a second example of EUT information broadcasted from a base station 400. The broadcasted EUT information is shown as a table 402 with a column 402a with candidate RSQ values in dB and one column 402b with associated EUT values in kbps estimated for downlink transmissions and another column 402c with associated EUT values in kbps estimated for uplink transmissions. Thereby, the cells can be evaluated differently by mobile terminals for downlink and uplink transmissions. In that case, the terminals may select different serving cells depending on whether downlink or uplink transmissions are anticipated. Alternatively, the terminals may evaluate the cells based on an average of downlink and uplink EUT values. The EUT values in FIG. 3 can be seen as representative for both uplink and downlink.

With reference to the flow chart in FIG. 5, the solution will now be described in terms of actions executed in a mobile terminal, such as the terminal 104 of FIG. 1, for evaluating a cell in which a base station provides radio coverage. In this process, the terminal evaluates one cell, e.g. for cell selection or cell re-selection, but it should be understood that the shown actions may as well be executed for any number of further cells, e.g. depending on the terminal's current location, status and/or configuration. It should also be noted that this solution may be used for re-selection between neighbouring cells that have been allocated the same frequency band, or different frequency bands, or partly overlapping frequency bands, for communication. The solution is thus not limited in this respect.

A first action 500 indicates that the terminal measures the RSQ of received reference signals transmitted from the base station, basically according to regular procedures. Another action 502 indicates that the terminal also receives and reads EUT information which is broadcasted from the base station. As in the examples above, the broadcasted EUT information comprises cell-specific EUT values for a series of candidate RSQ values. Actions 500 and 502 are not dependent on each other and may be executed in any order or simultaneously.

The terminal is then able to determine, in action 504, which EUT value is valid for the terminal's current radio conditions relative the base station, based on the broadcasted EUT information, as follows. First, the above-mentioned measured RSQ value is matched with the candidate RSQ values in the EUT information, to identify a candidate RSQ value that is substantially equal or closest to the measured RSQ value. Second, the EUT value that is associated with the identified candidate RSQ value is selected as an EUT value which is currently valid for the terminal thus reflecting an expected data throughput, in this description referred to as the "valid EUT value". As mentioned above, the valid EUT value may also be determined from interpolation or extrapolation in proportion to a deviation of the measured RSQ value from the candidate RSQ value(s) being closest to the measured RSQ value. If the broadcasted EUT information contains separate uplink and downlink EUT values, the terminal may select either or both of them as valid EUT value(s), as explained in the description above for FIG. 4.

In a further action 506, the terminal starts evaluating the cell for cell selection or re-selection based on the valid EUT value determined in action 504. As indicated above, the terminal may determine a valid EUT value for at least one other cell, and the cells can be ranked according to their valid EUT values in the evaluation. The terminal may then select a cell having the highest EUT value amongst the cells, to be the serving cell for the terminal, either in a cell selection procedure such as when the terminal has just been powered-on, or in a cell re-selection procedure when the terminal is configured to evaluate cells in its vicinity e.g. at regular intervals.

When the terminal is currently connected to a serving cell, evaluating one or more cells may involve selecting a new cell, different from the current serving cell, as serving cell for the terminal if the new cell fulfils a predefined cell evaluation condition for the valid EUT value. In this example, a next action 508 indicates that the terminal checks if the valid EUT value of the cell under evaluation fulfils the predefined cell evaluation condition. If so, the terminal changes its serving cell by connecting to the new cell in action 510 and if not, the terminal stays with the current serving cell in action 512.

A cell evaluation condition for the valid EUT value may thus be used by the terminal to compare two cells for selection or re-selection. For example, the cell evaluation condition may dictate that the terminal should switch to a new cell if the valid EUT value determined for the new cell exceeds a preset threshold, or exceeds the valid EUT value of a current serving cell with a preset amount.

In another example, the terminal may be configured to use the EUT parameter for evaluating the cell provided that the measured RSQ value exceeds a preset minimum threshold, to avoid that the terminal selects a cell with unacceptable, i.e. too low, signal quality. Thereby, the cell will be evaluated, and most likely discarded, on the basis of the low measured RSQ value, even though a reasonable data throughput could otherwise be provided in the cell according to the valid EUT value obtained from the broadcasted EUT information for the measured RSQ value. On the other hand, the base station may also be configured to indicate the EUT value as unacceptable in the broadcasted EUT information for candidate RSQ values falling below the accepted threshold, e.g. by setting the EUT value to zero.

Different cells may also have been assigned different priorities when evaluated by mobile terminals for camping. For example, the network may have selected different priorities for its cells to control the load in the cells. Below, a few possible examples of cell evaluation conditions with consideration to such priorities are presented, which may be used by mobile terminals when evaluating different cells.

1) For cells with equal priority, the new cell must have a higher EUT value than the current serving cell by a certain amount "A" for a certain time duration "t".

2) For a new cell with higher priority than the current serving cell, the EUT value of the new cell must exceed a certain threshold "T(high)" at least for a certain duration "t(high)".

3) For a new cell with lower priority than the current serving cell, the EUT value of the serving cell must be below a certain threshold "T(low)" at least for a certain duration "t(low)".

Figure 6:
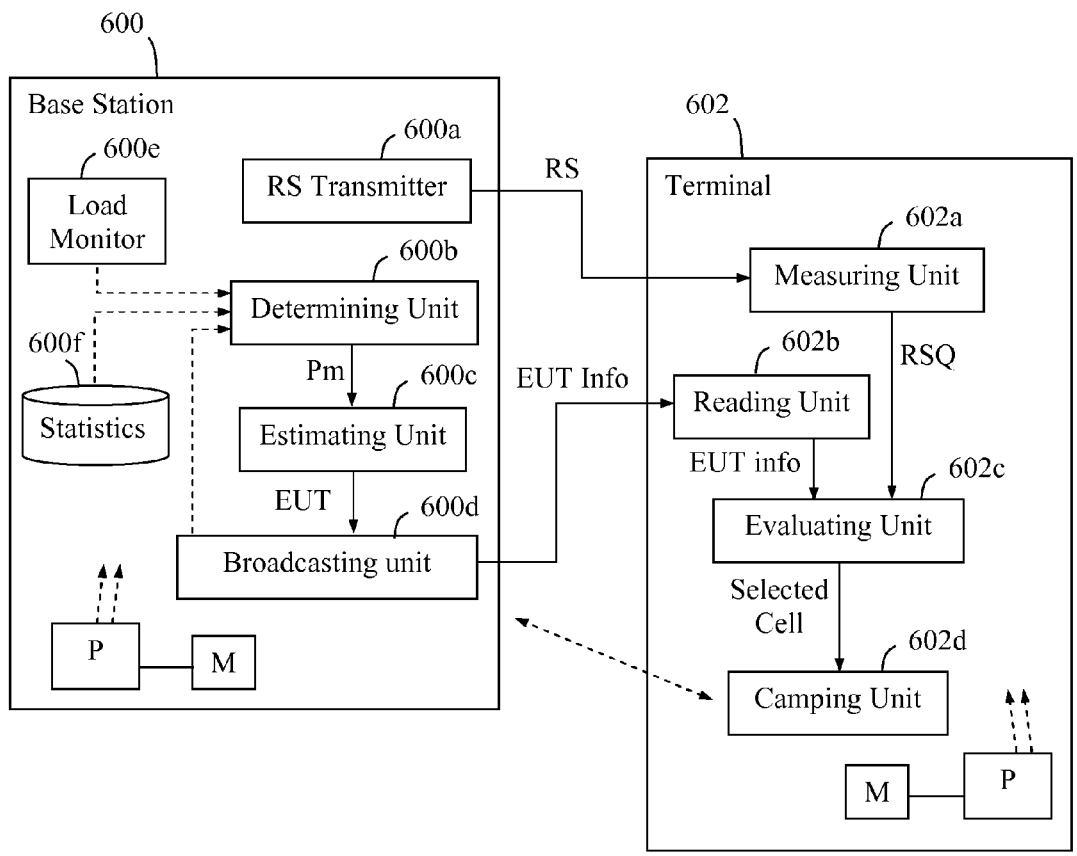
FIG. 6 is a block diagram illustrating a base station and a terminal in more detail, according to further possible embodiments.

A detailed but non-limiting example of how a base station and a mobile terminal can be configured to accomplish the above-described solution, is illustrated by the block diagram in FIG. 6. The base station 600 is configured to provide radio coverage in a cell and to support cell evaluation for mobile terminals in a cellular network, and the mobile terminal 602 is configured to support cell evaluation in a cellular network e.g. in the manner described above for any of FIGS. 1-5.

The base station 600 comprises an RS transmitter 600a adapted to transmit reference signals "RS" on which mobile terminals can measure the RSQ, e.g. according to regular procedures. The base station 600 also comprises a determining unit 600b adapted to determine a set of cell-specific parameters "Pm" pertaining to data throughput in the cell. The base station 600 further comprises an estimating unit 600c adapted to estimate an Expected User Throughput "EUT" for a series of candidate RSQ values based on the determined set of cell-specific parameters. The base station 600 further comprises a broadcasting unit 600d adapted to broadcast the estimated EUT as EUT information "EUT info" in the cell, thereby enabling mobile terminals to evaluate the cell for cell selection or re-selection based on the broadcasted EUT information.

The above base station 600 and its functional units 600a-d may be configured or adapted to operate according to various optional embodiments. As in the above-described examples, the cell-specific parameters Pm may be related to a current traffic load in the cell which the determining unit 600b may obtain from a load monitor 600e or the like.

The cell-specific parameters P may also be related to radio resources available for the cell. These radio resources may include at least one of: bandwidth allocated for the cell, the number of antennas used by the base station, hardware equipment in the base station, software installed in the base station and radio access technology used by the base station. All these factors may have an influence on the capability of the base station for communication. For example, if multiple receive antennas are used, such as when the concept of Multiple Input Multiple Output (MIMO) is employed in LTE for parallel and spatially multiplexed data streams, higher throughput and better accuracy can typically be achieved, as compared to using just one receive antenna.

The cell-specific parameters P may also be related to statistics on data throughput achieved in previously executed sessions in the cell at one or more of said candidate RSQ values. The determining unit 600b may obtain such statistics from a statistics storage 600f or the like. The cell-specific parameters P may also be related to currently, or most recently, broadcasted EUT information which the determining unit 600b may obtain from the broadcasting unit 600d.

In further optional embodiments, the estimating unit 600c may be further adapted to estimate the EUT values by performing at least one of: calculating the EUT values based on a link budget corresponding to each candidate RSQ value, and deriving the EUT values from statistics on data throughput achieved in previously executed sessions in the cell at different candidate RSQ values and traffic load conditions.

A measuring unit 602a in the mobile terminal 602 is configured to measure the RSQ for the reference signals RS transmitted from the base station 600. The mobile terminal 602 comprises a reading unit 602b adapted to read the EUT information broadcasted from base station 600, said EUT information comprising cell-specific EUT values for a series of candidate Reference Signal Quality, RSQ, values. The mobile terminal 602 also comprises an evaluating unit 602c adapted to determine a valid EUT value in the EUT information provided from the reading unit 602b, that corresponds to a measured RSQ value provided by the measuring unit 602a, and to evaluate the cell for cell selection or re-selection based on the determined valid EUT value. A resulting selected cell may then be provided from the evaluating unit 602c to a camping unit 602d or the like in the terminal, which is configured to camp on the selected cell according to regular procedures, as indicated by the dashed two-way arrow.

The above terminal 602 and its functional units 602a-d may be configured or adapted to operate according to various optional embodiments. For example, the evaluating unit 602c may be further adapted to determine a valid EUT value for at least one other cell, rank the cells according to their valid EUT values, and to select a cell having the highest EUT value as serving cell for the terminal. The evaluating unit 602c may also be adapted to select a new cell, different from a current serving cell, as serving cell for the terminal if the new cell fulfils a predefined evaluation condition for the valid EUT value. The evaluating unit 602c may further be adapted to use the EUT for evaluating the cell if the measured RSQ value exceeds a preset minimum threshold.

It should be noted that FIG. 6 merely illustrates various functional units in the base station 600 and the mobile terminal 602 in a logical sense, although the skilled person is able to implement these functions in practice using suitable software and hardware means. Thus, this aspect of the solution is generally not limited to the shown structures of the base station 600 and the terminal 602, while their functional units 600a-d and 602a-c may be configured to operate according to the features described for any of FIGS. 1-5 above, where appropriate.

The functional units 600a-d and 602a-c described above can be implemented in the base station 600 and the terminal 602, respectively, as program modules of a respective computer program comprising code means which, when run by a processor "P" in each of the base station 600 and the terminal 602 causes them to perform the above-described actions. Each processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in either of the base station 600 and the terminal 602, respectively, in the form of a memory "M" connected to each processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the base station 600 and the terminal 602.

When using the solution according to any of the above-described embodiments, one or more of the following advantages may be achieved. The new EUT parameter used in this solution by mobile terminals to evaluate cells, can be considered a more relevant and apt indicator of the radio performance and communication ability in the cell, than the conventionally used RSQ parameter.

The EUT parameter in this solution thus reflects different abilities of base stations in the cells for serving mobile terminals in terms of data throughput, which may depend on several factors and conditions such as current traffic load and available radio resources, which are not reflected at all in the measured RSQ parameter. Using the EUT parameter for cell evaluation will therefore enable a more reliable communication with the serving base station and also potentially higher throughput for the user of the mobile terminal. The RSQ parameter is still measured by the mobile terminal but is used merely for identifying a valid EUT value to use in the cell evaluation, as described in the examples above.

Further, this solution may provide a load sharing functionality in the following manner. When many mobile terminals have selected a particular cell as their serving cell, this will eventually result in an increased traffic load in that cell, which entails a lower EUT if estimated based on the traffic load being a cell-specific parameter, as discussed in example A) above. The lower EUT will in turn cause mobile terminals to move from the loaded cell to less loaded cells.

While the solution has been described with reference to specific exemplary embodiments, the description is generally only intended to illustrate the inventive concept and should not be taken as limiting the scope of the solution. For example, the terms "mobile terminal", "base station", "signal quality", "cell evaluation", "cell-specific parameter", "estimated user throughput", and "data throughput" have been used throughout this description, although any other corresponding nodes, functions, and/or parameters could also be used having the features and characteristics described here. The solution is defined by the appended claims.

The invention claimed is:

1. A method in a base station providing radio coverage in a cell, for supporting cell evaluation for mobile terminals in a cellular network, the method comprising:
   determining a set of cell-specific parameters pertaining to data throughput in the cell;
   estimating a value of an Expected User Throughput (EUT) for each of a series of candidate Reference Signal Quality (RSQ) values, based on the determined set of cell-specific parameters; and
   broadcasting the estimated EUT values as EUT information in the cell, thereby enabling mobile terminals to evaluate the cell for cell selection or re-selection based on the broadcasted EUT information.

2. The method of claim 1, wherein said cell-specific parameters are related to at least one of:
   a current traffic load in the cell;
   radio resources available for the cell;
   statistics on data throughput achieved in previously executed sessions in the cell at one or more of said candidate RSQ values; and
   currently broadcasted EUT information.

3. The method of claim 2, wherein said radio resources include at least one of: bandwidth allocated for the cell, the number of antennas used by the base station, hardware equipment in the base station, software installed in the base station and radio access technology used by the base station.

4. The method of claim 1, wherein estimating the EUT values comprises at least one of: calculating the EUT values based on a link budget corresponding to each candidate RSQ value, and deriving the EUT values from statistics on data throughput achieved in previously executed sessions in the cell at different candidate RSQ values and traffic load conditions.

5. The method of claim 1, wherein the broadcasted EUT information comprises one EUT value representative for each candidate RSQ value, or a first EUT value pertaining to uplink and a second EUT value pertaining to downlink for each candidate RSQ value.

6. A base station configured to provide radio coverage in a cell and support cell evaluation for mobile terminals in a cellular network, the base station comprising:
   a processing circuit including a processor and a memory storing a computer program for execution by the processor, whereby the processing circuit is configured to:
      determine a set of cell-specific parameters (Pm) pertaining to data throughput in the cell;
      estimate values a value of an Expected User Throughput (EUT) for each of a series of candidate Reference Signal Quality (RSQ) values, based on the determined set of cell-specific parameters; and
      broadcast the estimated EUT values as EUT information in the cell, thereby enabling mobile terminals to evaluate the cell for cell selection or re-selection based on the broadcasted EUT information.

7. The base station of claim 6, wherein said cell-specific parameters are related to at least one of:
   a current traffic load in the cell;
   radio resources available for the cell;
   statistics on data throughput achieved in previously executed sessions in the cell at one or more of said candidate RSQ values; and
   currently broadcasted EUT information.

8. The base station of claim 7, wherein said radio resources include at least one of: bandwidth allocated for the cell, the number of antennas used by the base station, hardware equipment in the base station, software installed in the base station and radio access technology used by the base station.

9. The base station of claim 6, wherein the processing circuit is further configured to estimate the EUT values by performing at least one of: calculating the EUT values based on a link budget corresponding to each candidate RSQ value, and deriving the EUT values from statistics on data throughput achieved in previously executed sessions in the cell at different candidate RSQ values and traffic load conditions.

10. The base station of claim 6, wherein the broadcasted EUT information comprises one EUT value representative for each candidate RSQ value, or a first EUT value pertaining to uplink and a second EUT value pertaining to downlink for each candidate RSQ value.

11. A method in a mobile terminal for cell evaluation in a cellular network, the method comprising:
   reading Expected User Throughput (EUT) information broadcasted from a base station providing radio coverage in a cell, said EUT information comprising a cell-specific EUT value for each of a series of candidate Reference Signal Quality (RSQ) values;
   determining from the EUT information a valid EUT value that corresponds to an RSQ value measured on reference signals from the base station; and
   evaluating the cell for cell selection or re-selection based on the determined valid EUT value.

12. The method of claim 11, wherein a valid EUT value is determined for at least one other cell and the cells are ranked according to their valid EUT values, wherein a cell having the highest EUT value is selected as serving cell for the terminal.

13. The method of claim 12, wherein a new cell, different from a current serving cell, is selected as serving cell for the terminal if the new cell fulfils a predefined evaluation condition for the valid EUT value.

14. The method of claim 11, wherein the EUT information is used for evaluating the cell only if the measured RSQ value exceeds a preset minimum threshold.

15. A mobile terminal configured to perform cell evaluation in a cellular network, the mobile terminal comprising:
   a processing circuit including a processor and a memory storing a computer program for execution by the processor, whereby the processing circuit is configured to:
      a read Expected User Throughput (EUT) information broadcasted from a base station providing radio coverage in a cell, said EUT information comprising a cell-specific EUT value for each of a series of candidate Reference Signal Quality (RSQ) values; and
      determine from the EUT information a valid EUT value that corresponds to an RSQ value measured on reference signals from the base station, and to evaluate the cell for cell selection or re-selection based on the determined valid EUT value.

16. The mobile terminal of claim 15, wherein the processing circuit is further configured to determine a valid EUT value for at least one other cell, to rank the cells according to their valid EUT values, and to select a cell having the highest EUT value as serving cell for the terminal.

17. The mobile terminal of claim 16, wherein the processing circuit is further configured to select a new cell, different from a current serving cell, as serving cell for the terminal if the new cell fulfils a predefined evaluation condition for the valid EUT value.

18. The mobile terminal of claim 15, wherein the processing circuit is further configured to use the EUT information for evaluating the cell only if the measured RSQ value exceeds a preset minimum threshold.

* * * * *